United States Patent
Ogawa et al.

(10) Patent No.: US 8,948,909 B2
(45) Date of Patent: Feb. 3, 2015

(54) ARTICLE LOADING SYSTEM, ARTICLE LOADING AND CARRYING-OUT METHOD

(75) Inventors: Kazuhiko Ogawa, Inuyama (JP); Takeshi Omae, Inuyama (JP)

(73) Assignee: Murata Machinery, Ltd., Kyoto (JP)

( * ) Notice: Subject to any disclaimer, the term of this patent is extended or adjusted under 35 U.S.C. 154(b) by 0 days.

(21) Appl. No.: 14/113,846

(22) PCT Filed: Mar. 6, 2012

(86) PCT No.: PCT/JP2012/001531
§ 371 (c)(1),
(2), (4) Date: Nov. 22, 2013

(87) PCT Pub. No.: WO2012/147261
PCT Pub. Date: Nov. 1, 2012

(65) Prior Publication Data
US 2014/0163721 A1    Jun. 12, 2014

(30) Foreign Application Priority Data

Apr. 28, 2011 (JP) ................................. 2011-102439

(51) Int. Cl.
G06F 7/00 (2006.01)
B65G 47/04 (2006.01)
B65G 1/04 (2006.01)
B65G 1/137 (2006.01)

(52) U.S. Cl.
CPC .............. B65G 47/04 (2013.01); B65G 1/0492 (2013.01); B65G 1/1378 (2013.01)
USPC ........... 700/215; 700/213; 700/214; 700/216; 700/217; 700/220

(58) Field of Classification Search
CPC combination set(s) only.
See application file for complete search history.

(56) References Cited

U.S. PATENT DOCUMENTS

2012/0029687 A1* 2/2012 Hagen et al. ................... 700/218
2012/0030070 A1* 2/2012 Keller et al. .................... 705/28

FOREIGN PATENT DOCUMENTS

| JP | 63-037005 A   | 2/1988 |
| JP | 2003-246421 A | 9/2003 |
| JP | 2010-023967 A | 2/2010 |

OTHER PUBLICATIONS

Official Communication issued in International Patent Application No. PCT/JP2012/001531, mailed on Jun. 12, 2012.
English translation of Official Communication issued in corresponding International Application PCT/JP2012/001531, mailed on Oct. 31, 2013.

\* cited by examiner

Primary Examiner — Yolanda Cumbess
(74) Attorney, Agent, or Firm — Keating & Bennett, LLP

(57) ABSTRACT

An article loading system for loading and carrying out, in one of a plurality of containers each having identification information, articles of plural types which correspond to the container, includes a holding shelf which temporarily holds the containers that are carried in, container placement units on each of which the container into which an article is to be loaded by a worker is placed, a transporting unit which transports an arbitrary container between the holding shelf and an arbitrary container placement unit, and a control unit programmed to control the transporting unit.

10 Claims, 3 Drawing Sheets

ARTICLE LOADING SYSTEM, ARTICLE LOADING AND CARRYING-OUT METHOD

BACKGROUND OF THE INVENTION

1. Field of the Invention

The present invention relates to an article loading system for sequentially loading articles picked by workers from plural picking areas into a container on a picking area-basis.

2. Description of the Related Art

A conventional article holding system employs a system capable of implementing what is called an assembly-line operation in which a container is transported using a long unicursal conveyor, and workers load articles (products) into the container in sequence from the upstream direction of the conveyor, as disclosed in Japanese Unexamined Patent Application Publication No. 2010-23967, for example. As a specific example of a conventional article loading system, there is a system in which: picking areas holding plural types of articles are set up at plural points near the unicursal conveyor; an attending worker assigned to each of the picking areas picks an article to be loaded into a container travelling from upstream before the container arrives at the point; the workers load the articles into the containers at the points along the conveyor; and this task is performed in sequence in the downstream direction of the conveyor and, in the end, the container containing all the necessary articles is carried out from the conveyor.

However, setting up a unicursal conveyor and picking areas so as to be spread out near the conveyor requires a wide space. Furthermore, increasing the number of containers to be processed in a short period of time requires many workers and, in addition, requires the lengthening of the conveyor. Furthermore, there is the problem that a disruption in the task of loading an article in the container at any point along the conveyor affects the entire conveyor, and article loading work efficiency easily deteriorates.

SUMMARY OF THE INVENTION

In view of the above problems, preferred embodiments of the present invention provide an article loading system which reduces the number of required workers and efficiently loads articles of plural types into containers even in a small space.

An article loading system according to a preferred embodiment of the present invention is an article loading system for loading and carrying out, in one of a plurality of containers each having identification information, articles of plural types which correspond to the container, the article loading system including: a holding shelf which temporarily holds the containers that are carried in; container placement units each including (i) a carry-in portion at which the container is received, (ii) a loading portion at which an article is loaded by a worker, and (iii) a carry-out portion at which the container loaded with the article is carried out, which are connected by a conveyor; a transporting unit configured to transport an arbitrary one of the containers between the holding shelf and the carry-in portion or the carry-out portion of an arbitrary one of the container placement units; a reporting unit which is provided in each of the container placement units and reports individual loading information which is information regarding articles to be loaded into the container and is linked to the identification information; and a control unit that is programmed to control the transporting unit so that the container having the identification information linked to the individual loading information reported by the reporting unit is transported to a corresponding one of the container placement units.

Accordingly, a container that is carried in and held temporarily can be transported freely between the holding shelf and an arbitrary container placement unit. Therefore, the concept of upstream and downstream as in a unicursal conveyor are eliminated, and thus, even when the task of loading articles into a container placed in one container placement unit is disrupted, the adverse effects on the article loading tasks in another container placement unit are reduced or prevented as much as possible. Therefore, the work efficiency of the article loading system is significantly improved, and high throughput can be obtained even with a small number of workers. Furthermore, the need to install a long conveyor, and so on, is eliminated, and thus an article loading system can be installed even in a small space.

Furthermore, assuming that the holding shelf is expanded in the vertically and the transporting unit is compatible therewith, it is possible to install an article loading system capable of improving spatial efficiency and handling a wide variety of articles in an even smaller space.

In addition, the control unit may, after the individual loading information is reported by the reporting unit, perform the control to transport the container corresponding to the individual loading information to the container placement unit.

Accordingly, when individual loading information is reported in advance, the gathering task in the picking area can be performed in advance based on this information, and the timing to load articles and the timing to place a container on the container placement unit are brought closer to each other. Therefore, it is possible to reduce unnecessary idle time such as when a worker waits for the arrival of a container.

In addition, the article loading system may further include a progress information obtaining unit which obtains progress information which is information regarding progress of a gathering task at a picking area provided near a different one of the container placement units, the gathering task being a task of gathering the articles corresponding to the individual loading information, wherein the control unit may, based on the progress information, be programmed to perform the control to transport the container corresponding to the progress information, to the container placement unit.

Accordingly, the timing at which the task of gathering articles is completed and the timing to start the loading task of loading articles into a container can be synchronized.

The progress information obtaining unit may obtain, as the progress information, all article gathering situations, and the control unit may be programmed to perform the control to transport the container corresponding to the progress information to the container placement unit, when the progress information exceeds a predetermined value.

In this manner, obtaining the progress of the gathering task in full detail allows the timing at which the task of gathering articles is completed and the timing to start the loading task of loading articles into a container to be adjusted more finely. Therefore, it is possible to prevent the occurrence of idling of a worker in the container placement unit.

The progress information obtaining unit may obtain, as the progress information, only information indicating completion of the gathering of the articles.

Accordingly, the aforementioned advantageous effects can be obtained by merely obtaining only completion information which is a type of progress information, and thus a simple configuration can be adopted for the article loading system.

Furthermore, each of the container placement units may include: a retaining portion at which more than one of the containers are temporarily retained; and a number-retained obtaining unit configured to obtain the number of containers retained at the retaining portion, and the control unit may be programmed to perform the control to preferentially transport the container to one of the container placement units from which a smaller number of containers retained is obtained by the retained-number obtaining unit rather than one of the container placement units from which a larger number of containers retained is obtained.

Accordingly, the work efficiency of the entire article loading system is significantly improved, and high throughput is attained.

According to various preferred embodiments of the present invention, it is possible to construct an article loading system even with a small set-up space, and it is possible to provide an article loading system capable of obtaining high throughput even when the number of workers involved in the loading task is small.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Next, preferred embodiments of an article loading system according to the present invention shall be described in detail with reference to the Drawings. It should be noted that the subsequent preferred embodiments are merely examples of the article loading system according to the present invention. Therefore, the scope of the present invention is defined by the recitations in the Claims, with reference to the subsequent preferred embodiments, and is not limited to only the subsequent preferred embodiments.

Figure 1:
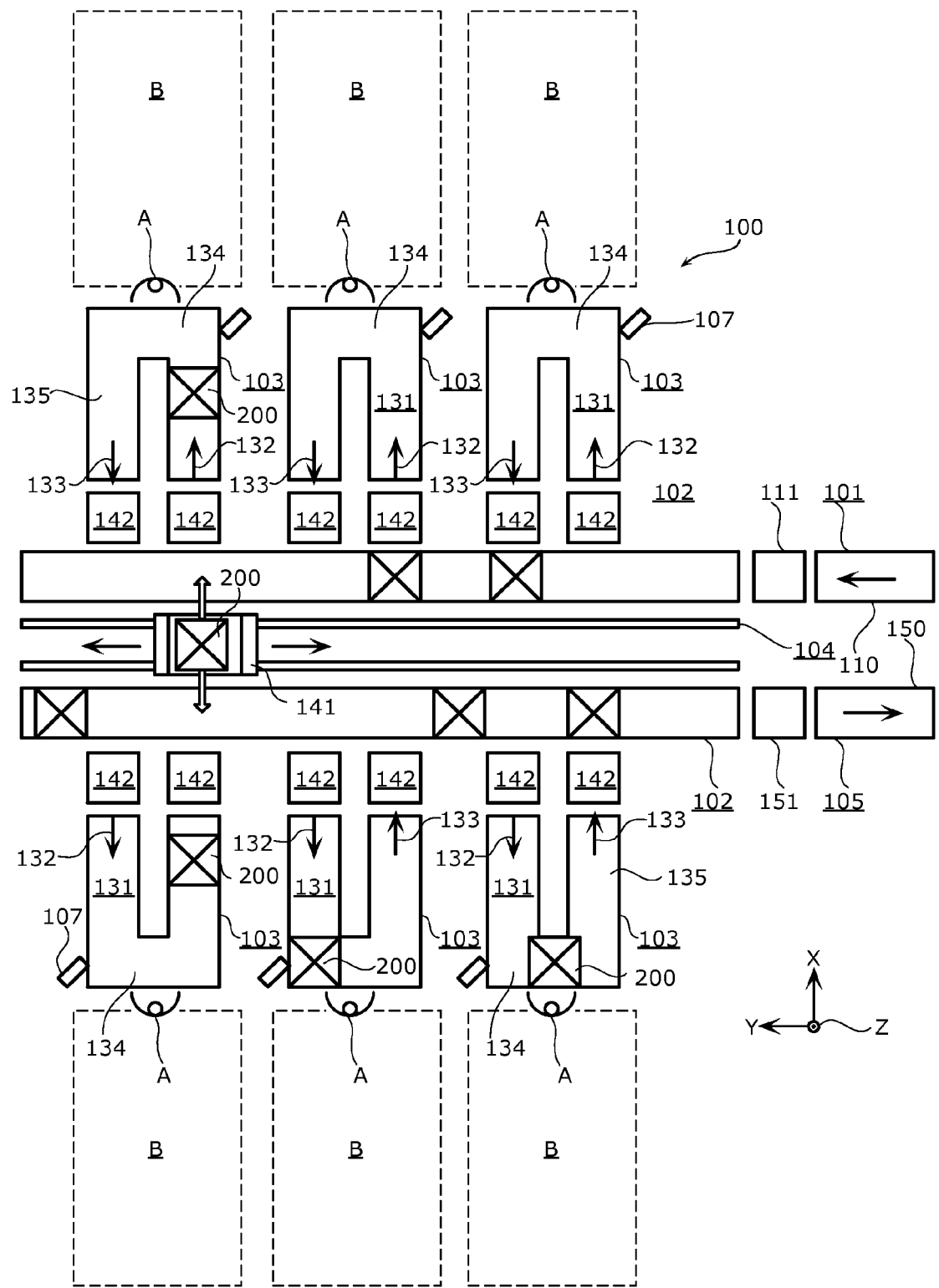
FIG. 1 is a schematic plan view an entire article loading system.

FIG. 1 is a schematic planar view of the entire article loading system.

Figure 2:
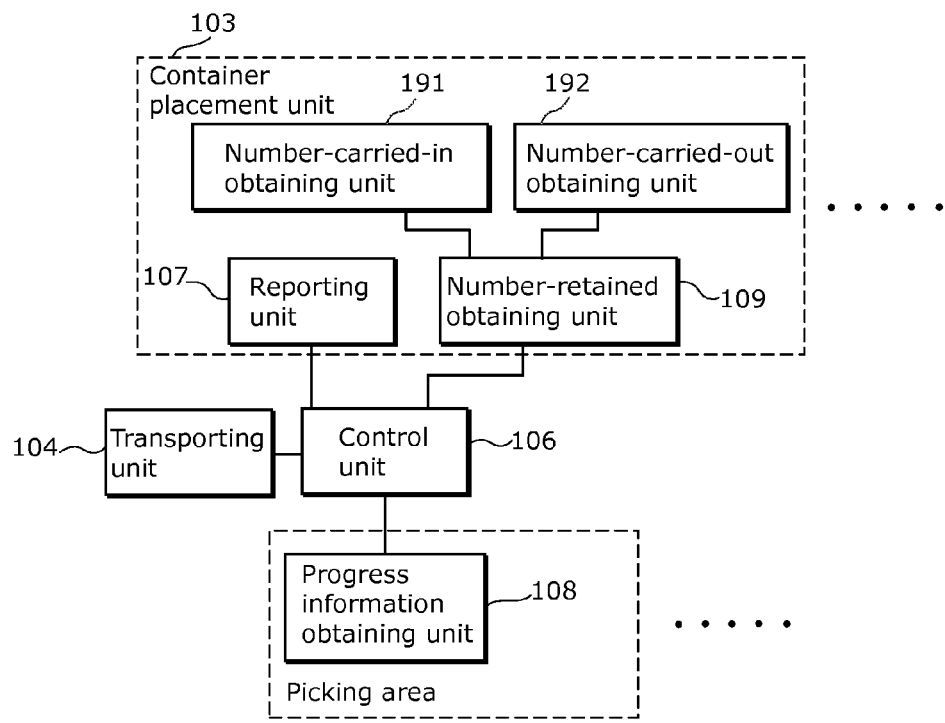
FIG. 2 is a block diagram showing the functional configuration of the article loading system.

FIG. 2 is a block diagram showing the functional configuration of the article loading system.

As seen in the figures, an article loading system 100 is a system for loading and carrying out, in an individually identifiable container 200, articles of plural types (not shown in the figures) which correspond to the container 200. The article loading system 100 includes holding shelves 102, container placement units 103, a transporting unit 104, and a control unit 106. Furthermore, in the case of this preferred embodiment, the article loading system 100 includes a main carry-in unit 101, a main carry-out unit 105, reporting units 107, progress information obtaining units 108, and number-retained obtaining units 109.

The main carry-in unit 101 is an apparatus that carries in the empty container 200 to the article loading system 100. The main carry-out unit 105 is an apparatus that carries out the container 200 for which the loading of articles in the article loading system 100 has been completed. In the case of this preferred embodiment, the main carry-in unit 101 and the main carry-out unit 105 respectively include conveyors 110 and 150 which transport the container 200 in a horizontal direction, and lifts 111 and 151 which transport the container 200 in the vertical direction and transfer the container 200 between corresponding ones of the conveyors 110 and 150 and the holding shelves 102. By providing the lifts 111 and 151, it becomes possible to carry in the container 200 to an arbitrary height in a holding shelf 102, and carry out the container 200 held in an arbitrary height in a holding shelf 102.

Here, the container 200 preferably is a container referred to as a foldable container, and is provided with identification information which allows identification of individual containers 200. For example, the container 200 includes a bar code attached as the identification information, or is provided with an RF tag on which the identification information is recorded.

It should be noted that the main carry-in unit 101 and the main carry-out unit 105 can be substituted by the container placement unit 103. Specifically, a worker A, or the like, can, with respect to the container placement unit 103, carry in a container 200 from the outside, as well as carry out to the outside, a container for which the loading of articles is finished.

Figure 3:
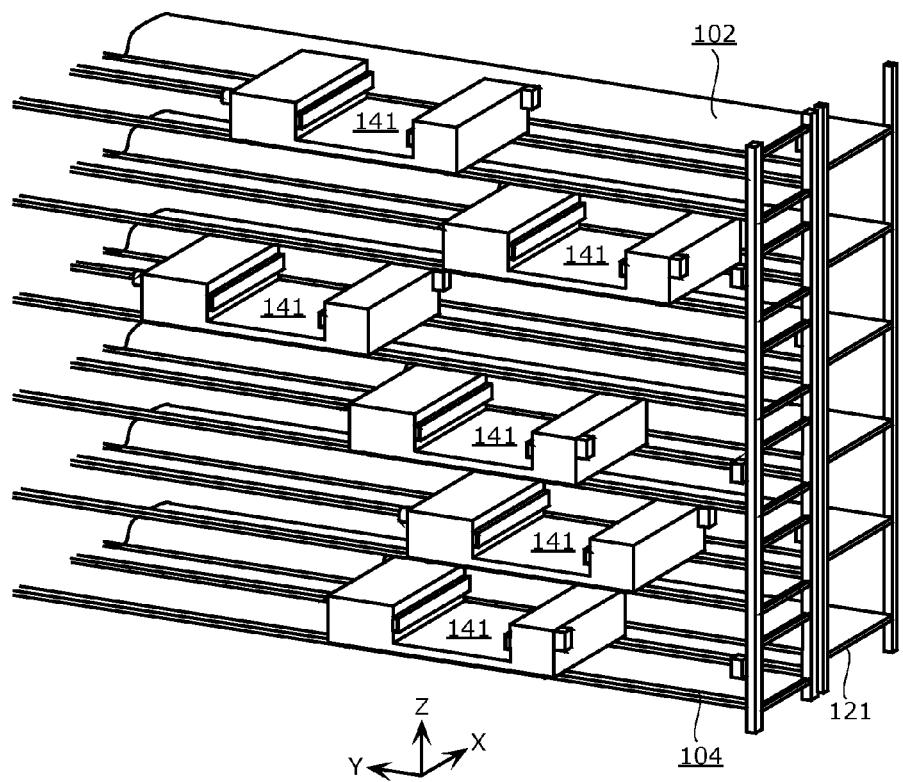
FIG. 3 is a schematic perspective view of a portion of a holding shelf and a portion of a transporting unit.

FIG. 3 is a schematic perspective view of a portion of a holding shelf and a portion of a transporting unit.

As shown in FIG. 3, the holding shelf 102 temporarily holds containers 200 that are carried in. In the case of this preferred embodiment, the holding shelf 102 is a shelf including, in the vertical direction (Z-axis direction), plural levels of shelf boards 121 capable of holding containers 200 arranged in the Y-axis direction. Therefore, the holding shelf 102 can hold the containers 200 in a matrix in the YZ planes. It should be noted that the same is true for other holding shelves 102 not shown in the figure, and the height of the shelf boards 121 are consistent.

In this manner, by providing holding shelves 102 extending in the vertical direction, it is possible to attain work efficiency for the article loading task while reducing the footprint of the article loading system 100.

The transporting unit 104 is equipment which transports an arbitrary container 200 between a holding shelf 102 and a carry-in unit 132 or a carry-out unit 133 of an arbitrary container placement unit 103. There is no particular limitation as to the transporting unit 104, and a transporting apparatus such as a stacker crane, a lift, a conveyor, or the like, are non-limiting examples.

In this preferred embodiment, the transporting unit 104 includes rails each laid along the Y-axis direction at a height corresponding to a different one of the shelf boards 121 of the holding shelf 102, and cars 141 which shuttle back-and-forth on the rails. Each of the cars 141 is what is called a shuttle-type transporting apparatus and includes an apparatus capable of transferring a container 200 between the car 141 and the holding shelf 102. In addition, the transporting unit 104 also includes, as transporting apparatuses, lifts 142 each of which is capable of transferring a container 200 in the vertical direction between respective shelf boards 121.

Each car 141 is a car capable of receiving, at respective levels at which the shelf boards 121 are located, a container 200 set on a shelf board 121, moving along the Y-axis direction (e.g., the direction in which the shelf board 121 extends), and transferring the container 200 to a different location of the shelf board 121 at the same height.

As described above, by having the shuttle-type transporting apparatus provided with plural cars 141 corresponding to the respective shelf boards 121, the transporting unit 104 can transport plural containers 200 at each of the levels rapidly at the same time, and, by using such in combination with the lifts 142, can transport the containers 200 rapidly from the holding shelf 102 to an arbitrary container placement unit 103. Furthermore, the transporting unit 104 can also transport the containers 200 rapidly from the container placement unit 103 to the holding shelf 102. Therefore, it is possible to transport the containers 200 rapidly from one container placement unit 103 to another container placement unit 103, via the holding shelf 102.

Each container placement unit 103 is an apparatus in which a carry-in portion 132 at which a container is received, a loading portion 134 at which the loading of an article is performed by a worker A, and a carry-out portion 133 at which the container loaded with the article is carried out, are connected by a conveyor 135. In this preferred embodiment, as shown in FIG. 1, the container placement unit 103 includes: the carry-in portion 132 into which a container 200 is carried in from the lift of the transporting unit 104; the carry-out unit 133 which carries out the container 200 to another lift 142; and the conveyor 135 which includes, disposed between the carry-in portion 132 and the carry-out portion 133, a placement portion at which the container 200 into which the worker A is to load an article is placed. It should be noted that either a driven-type or a non-driven-type can be used for the conveyor 135.

Furthermore, the container placement unit 103 includes, between the carry-in portion 132 and the placement portion: a retaining portion 131 at which plural containers 200 are temporarily retained; and the number-retained obtaining unit 109 which obtains the number of containers 200 retained at the retaining portion 131. Furthermore, the container placement unit 103 includes, as the number-retained obtaining unit 109, a number-carried-in obtaining unit 191 (see FIG. 2) which counts the number of containers 200 carried in through the carry-in portion 132, and a number-carried-out obtaining unit 192 (see FIG. 2) which counts the number of containers 200 carried out through the carry-out portion 133. The number-retained obtaining unit 109 subtracts the number of containers carried out from the number of containers carried in, which have been obtained, and obtains the difference as the number of containers retained.

It should be noted that the number-retained obtaining unit 109 may capture images of the entire retaining portion 131 and obtain the number of containers retained through image analysis. Furthermore, when RF tags are attached to the containers 200, the number of RF tags may be obtained, without contact, through scanning at the retaining portion 131, and this number may be used as the number of containers retained.

Each of the reporting units 107 is an apparatus that reports individual loading information which is information regarding an article to be loaded into a container 200 placed on the container placement unit 103. In the case of this preferred embodiment, each of the reporting units 107 preferably includes a display apparatus (display) attached to the respective container placement units 103. Furthermore, the individual loading information reported by the reporting unit 107 is information regarding the type or number of the article to be loaded into a container 200 placed on a certain container placement unit 103. Therefore, the individual loading information is information that is different for the plural container placement units 103.

It should be noted that the reporting unit 107 need not always be a display apparatus, and may be an apparatus which reports the individual loading information by way of printouts. Furthermore, the reporting unit 107 may also be an apparatus which identifies, using a bar code, an article that a worker A is attempting to load, and reports, using sound, whether or not the article may be loaded into the container.

Each of the progress information obtaining units 108 is an apparatus which obtains progress information which is information regarding the progress of a gathering task which is a task in which articles are gathered in picking areas B each corresponding to a different one of the container placement units 103.

For example, in the case where operation is carried out in a way that "when retrieving a required article from a display shelf provided in a picking area B, a worker pushes a button provided on the display shelf for each product type", all gathering situations in which such button is pressed are obtained, and the number of times the button is pressed is obtained as the progress information.

Here, in the article loading system 100, the gathering task in the picking area B may be known, or the gathering task may be reported in the picking area B. In addition, the percentage of the entire gathering task that has been accomplished may be obtained as the progress information. It should be noted that as specific gathering tasks, there are, for example, the task of gathering articles corresponding to items of individual loading information from the picking area B, the task of gathering articles from the picking area B in accordance with a single item of individual loading information, and so on.

Furthermore, in the case where operation is carried out in a way that "when a worker working in the picking area B completes the gathering task, the worker pushes a task-finished button", the progress information obtaining unit 108 may obtain, as the progress information, only information indicating that the button has been pushed.

The control unit 106 preferably is a processing apparatus which is programmed to control the transporting unit 104 in order to adjust the flow of the articles 200. The control unit 106 preferably is a computer including, for example, a central processing unit, a memory, various interfaces, and so on. By executing various programs, the control unit 106 calculates, by arithmetic computation, information regarding control based on the obtained information, and controls the transporting unit 104 based on the results.

Figure 4:
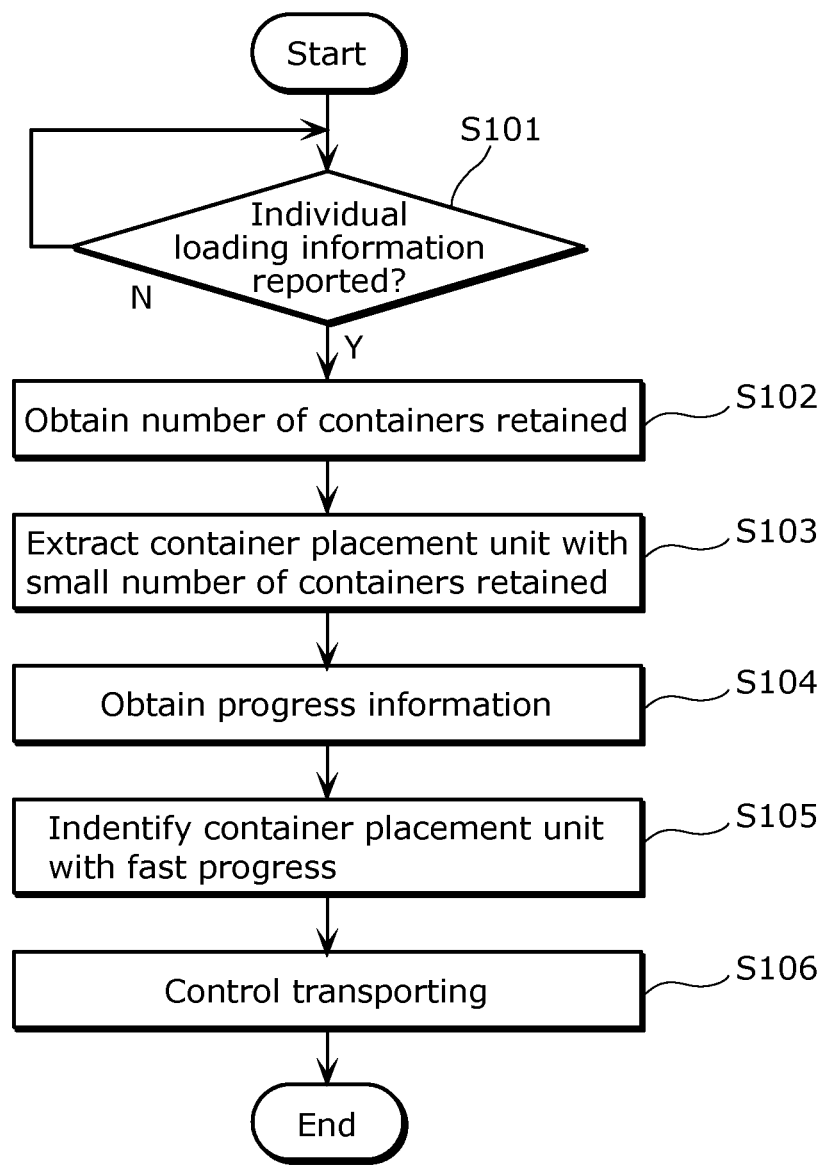
FIG. 4 is a flowchart showing the flow of operations performed by a control unit.

FIG. 4 is a flowchart showing the flow of the operation performed by the control unit.

For example, as shown in the figure, the control unit 106 makes a query to the reporting unit 107 as to whether or not the reporting unit 107 has reported individual loading information (S101). When the control unit 106 obtains information indicating that the reporting unit 107 has reported individual loading information (S101: Y), the control unit 106 makes a query to the retained-number obtaining units 109 about the number of containers retained in the respective container placement units 103 for which the individual loading information has been notified (S102). Next, the control unit 106 extracts container placement units 103 with a small number of containers retained. Specifically, the control unit 106 extracts a container placement unit 103 with a predetermined number of containers retained or less (S103). Furthermore, the control unit 106 may extract the container placement unit 103 with the smallest number of containers retained. Next, the control unit 106 makes a query to the progress information obtaining unit 108 about the progress of the article gathering task in the picking area B corresponding to the extracted container placement unit 103 (S104). Next, the control unit 106 identifies a container placement unit 103 which has a small number of containers retained and corresponds to the picking area B with a gathering task that is progressing fast (S105). The control unit 106 calculates an order of priority for transporting the containers 200, based on the smallness of the number of containers retained and the level of progress of the gathering task, and, based on the result, controls the transporting unit 104 so that the container 200 linked to the individual loading information is transported to the corresponding container placement unit 103 (S106).

The above-described control is performed with respect to a container 200 that has been carried in from the main carry-in unit 101 and not carried out from the main carry-out unit 105, that is, a container 200 set on the holding shelf 102, and so on. Then, when all articles are loaded into the container 200, the transporting unit 104 transports such container 200 to the main carry-out unit 105.

Accordingly, since the container 200 that should be placed on the container placement unit 103 is determined, based on the level of progress of the gathering task in the picking area B, before the completion of such gathering task, and since the container 200 is transported to the container placement unit 103 with no or few retained containers 200, it is possible to minimize idling of the container placement unit 103 such as when waiting for the arrival of the container 200, and thus it is possible to efficiently allocate containers 200 to the container placement units 103.

This is due to the provision of the transporting unit 104 which is capable of arbitrarily transporting containers 200 from one container placement unit 103 to another container placement unit 103. In particular, by using the transporting unit 104 which includes (i) what is called a shuttle-type transporting apparatus including cars 141 capable of shuttling to and from each of the levels of the holding shelves 102 and transferring the containers 200 to arbitrary locations and (ii) lifts 142 which transfer the containers 200 in the vertical direction, the containers 200 are transported rapidly and in parallel, and thus loading efficiency in the loading of articles is significantly improved.

It should be noted that the present invention is not limited to the above-described preferred embodiment. For example, other preferred embodiments that can be realized by arbitrarily combining constituent elements described in the present specification or by removing some constituent elements may be preferred embodiments of the present invention. Furthermore, modifications obtainable through various changes to the above-described preferred embodiment that can be conceived by a person of ordinary skill in the art without departing from the essence of the present invention, that is, the meaning of the recitations in the claims are included in the present invention.

For example, the transporting unit 104 need not include a shuttle-type transporting apparatus and lift. For example, the transporting unit 104 may be a stacker crane, or the like. Furthermore, the number, and so on, of the holding shelves 102 and the shuttle-type transporting apparatus can be set arbitrarily.

Furthermore, the control performed by the control unit 106 is not limited to that in the above-described preferred embodiment, and it is possible to freely and arbitrarily combine control steps, as well as change the details of the respective control steps.

For example, control may be performed without obtaining progress information. Furthermore, there are cases where the retaining portion 131 is not present in the container placement unit 103. In this case, the transporting destination of a container 200 may be determined depending on whether or not a container placement unit 103 is empty, without obtaining the number of containers retained.

Various preferred embodiments of the present invention can be applied to a distribution warehouse and the like in which plural types of articles (products) manufactured by plural makers are temporarily gathered together in a warehouse, and so on, and the gathered articles are sorted on a sales outlet basis. In particular, various preferred embodiments of the present invention can be applied to the task of sorting articles that can be handled by workers hands, such as medical products and food products.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention of claimed is:

1. An article loading system for loading and carrying out articles of plurality into and out of one of a plurality of containers, each of the plurality of containers having identification information which corresponds to the containers, the article loading system comprising:
    a holding shelf which temporarily holds the containers that are carried in;
    container placement units each including: (i) a carry-in portion at which the container is received, (ii) a loading portion at which an article gathered by a worker in a corresponding picking area is loaded, and (iii) a carry-out portion at which the container loaded with the article is carried out, which are connected by a conveyor;
    a transporting unit configured to transport an arbitrary one of the containers between the holding shelf and the carry-in portion or the carry-out portion of an arbitrary one of the container placement units;
    a reporting unit provided in each of the container placement units and configured to report individual loading information which is information regarding articles to be loaded into the container and is linked to the identification information; and
    a control unit configured and programmed to control the transporting unit so that the container having the identification information linked to the individual loading information reported by the reporting unit is transported to a corresponding one of the container placement units; wherein
    the container placement units are disposed along the holding shelf which temporarily holds the containers.

2. The article loading system according to claim 1, wherein the control unit is configured and programmed to control the transport of the container corresponding to the individual loading information to the container placement unit after the individual loading information is reported by the reporting unit.

3. The article loading system according to claim 1, further comprising:
    a progress information obtaining unit configured to obtain progress information which is information regarding progress of a gathering task at a picking area provided near a different one of the container placement units, the gathering task being a task of gathering the articles corresponding to the individual loading information; wherein
    the control unit is configured and programmed to, based on the progress information, perform control to transport the container corresponding to the progress information, to the container placement unit.

4. The article loading system according to claim 3, wherein
the progress information obtaining unit is configured to
obtain, as the progress information, all article gathering
situations; and
the control unit is configured and programmed to perform
control to transport the container corresponding to the
progress information to the container placement unit,
when the progress information exceeds a predetermined
value.

5. The article loading system according to claim 3, wherein
the progress information obtaining unit is configured to
obtain, as the progress information, only information indicating completion of the gathering of the articles.

6. The article loading system according to claim 1, wherein
each of the container placement units includes:
a retaining portion at which more than one of the containers are temporarily retained; and
a number-retained obtaining unit configured to obtain the number of containers retained at the retaining portion; wherein
the control unit is configured and programmed to perform control to preferentially transport the container to one of the container placement units from which a smaller number of containers retained is obtained by the retained-number obtaining unit rather than one of the container placement units from which a larger number of containers retained is obtained.

7. The article loading system according to claim 2, further comprising:
a progress information obtaining unit configured to obtain progress information which is information regarding progress of a gathering task at a picking area provided near a different one of the container placement units, the gathering task being a task of gathering the articles corresponding to the individual loading information; wherein
the control unit is configured and programmed to, based on the progress information, perform control to transport the container corresponding to the progress information, to the container placement unit.

8. The article loading system according to claim 7, wherein
the progress information obtaining unit is configured to
obtain, as the progress information, all article gathering
situations; and
the control unit is configured and programmed to perform
control to transport the container corresponding to the
progress information to the container placement unit,
when the progress information exceeds a predetermined
value.

9. The article loading system according to claim 7, wherein
the progress information obtaining unit is configured to
obtain, as the progress information, only information indicating completion of the gathering of the articles.

10. An article loading and carry-out method for loading and carrying out article of plural type into and out of one of a plurality of containers, each of the plurality of containers having identification information which correspond to the containers, the method comprising:
temporarily holding, on a holding shelf, the containers that are carried in;
transporting, by a transporting unit, an arbitrary one of the containers between The holding shelf and a carry-in portion or a carry out portion of an arbitrary one of container placement units disposed along the holding shelf, each of the container placement units including:
(i) a carry-in portion at which the container is received,
(ii) a loading portion at which an article gathered by a worker in a corresponding picking area is loaded, and
(iii) a carry-out portion at which the container loaded with the article is carried out, which are connected by a conveyor;
reporting, by a reporting unit, individual loading information which is information regarding articles to be loaded in the container and is linked to the identification information; and
controlling, by a control unit, the transporting unit so that the container having the identification information linked to the individual loading information reported by the reporting unit is transported to a corresponding one of the container placement units.

* * * * *